INVENTOR.
RAMON L. ADDINALL
ROBERT J. MILBOURNE

May 6, 1969  R. L. ADDINALL ET AL  3,442,608

REGENERATION OF WASTE PICKLE LIQUORS

Filed May 6, 1968  Sheet 2 of 2

INVENTOR.
RAMON L. ADDINALL
ROBERT J. MILBOURNE

BY

Agents

United States Patent Office 3,442,608
Patented May 6, 1969

3,442,608
REGENERATION OF WASTE PICKLE LIQUORS
Ramon Leonard Addinall, Stoney Creek, Ontario, and Robert J. Milbourne, Burlington, Ontario, Canada, assignors to The Steel Company of Canada, Limited, Hamilton, Ontario, Canada, a company of Canada
Continuation-in-part of application Ser. No. 408,988, Nov. 4, 1964. This application May 6, 1968, Ser. No. 726,970
Int. Cl. C01b 9/02
U.S. Cl. 23—154    13 Claims

ABSTRACT OF THE DISCLOSURE

A process for the regeneration of hydrochloric acid solutions containing metal chlorides wherein the acid solutions are fed at a controlled rate onto a hot surface in an oxidizing atmosphere within an externally heated reaction chamber for vaporization of the liquid constituents of the solution, deposition of hydrated metal chlorides, oxidation and dehydration of said metal chlorides, and hydrolysis of the oxidized metal chlorides by reaction with steam produced in situ.

CROSS-REFERENCES TO RELATED APPLICATIONS

This application is a continuation-in-part of application Ser. No. 408,988, filed Nov. 4, 1964, now abandoned.

BACKGROUND OF THE INVENTION

This invention relates to a novel process and apparatus for the regeneration of acid solutions of metal chlorides and is particularly directed to the regeneration of hydrochloric acid waste pickle liquors for the recovery of acid values with the attendant production of iron oxide.

In steel mills, for example, the pickling of steel with hydrochloric acid for removal of iron oxide scales and the reclaiming of spent hydrochloric acid with the concurrent production of iron oxide as a low-value by-product for feed to the furnaces is known. Conventional processes for regeneration of such liquors, however, inherently suffer from serious drawbacks in their operation or products produced thereby. The Ruthner process, for example, as disclosed in United States Patents Nos. 2,785,957 and 2,785,999, comprises the direct roasting of ferrous chloride slurries which results in the production of a hard, unworkable sludge of partial hydrate of ferrous chloride which is of little commercial value and which represents substantial chloride losses. The Dravo-Ruthner process, a modification of the Ruthner process, permits production of iron oxide but suffers from the disadvantage of producing a copious, dilute vapour stream containing the product hydrochloric acid liberated in a countercurrently operated roaster and the gaseous products of combustion which necessitates a costly and complex gas-absorbing system for concentration and recovery of the hydrochloric acid. The latter process is sensitive to the composition of the feed liquor and requires storage and homogenization of the liquor for optimum operation of the process.

It is an important object of the present invention, therefore, to provide a continuous, closed liquid-gas circulating system for the regeneration of acid solutions of metal salts such as waste pickle liquors for the recovery of acid values.

It is another important object of the present invention to provide a novel process and apparatus for the production of high-purity metal oxides in powder form independent of the concentrations of the input liquors.

And another object of the invention is the provision of an externally heated vessel to maintain separate and to avoid the mixing of gaseous products of combustion with the product hydrochloric acid.

A further object of the present invention is the provision of a simple and economic process which can be readily carried out in compact reactors and adapted for use in either small or large-scale waste pickle liquor regeneration systems.

SUMMARY OF THE INVENTION

We have discovered an improved process and apparatus for the regeneration of acid solutions of metal salts which effectively accomplish these and other objects substantially independent of feed liquor composition wherein decomposition of the metal salts liberates the acids for re-use and produces a metal oxide product which can be readily adapted for use in powder metallurgy, furnace feed, pigments, abrasives and the like. We have found that the controlled introduction of a waste pickle liquor such as, for example, a solution of ferrous chloride and hydrochloric acid in water in the form of pulsed discrete portions of the solution onto the heated hearth of an externally heated evaporating chamber having an oxidizing atmosphere therein results in the immediate vaporization of the free hydrochloric acid and water and the deposition of a solid residue of hydrated ferrous chloride which is oxidized and dehydrated, then decomposed in the presence of the steam evolved from the next following discrete portions of solution to form ferric oxide. The vaporized free hydrochloric acid and water together with the hydrochloric acid latent in the ferrous chloride are passed to a condenser and recycled to the pickle system and the solid ferric oxide removed in substantially pure form from the system as product material.

It will be understood that although the following detailed description of the process and apparatus is directed to the regeneration of hydrochloric acid waste pickle liquor that the process and apparatus of the present invention can be applied to the regeneration of other like acid solutions of metal chlorides.

It will be also understood that although the process of the present invention directed to the regeneration of hydrochloric acid waste pickle liquor is free of hypothetical considerations, it is believed that the layer of hydrated ferrous chloride formed on the heated hearth surface upon the vaporization of free hydrochloric acid and water is rapidly oxidized to the ferric state and dehydrated to leave anhydrous ferric chloride according to the following reactions:

(1) $2FeCl_2 \cdot 4H_2O + H_2O + 2HCl + \tfrac{1}{2}O_2$
$\rightarrow 2FeCl_3 \cdot 6H_2O$ (2) $FeCl_3 \cdot 6H_2O \rightarrow FeCl_3 + 6H_2O$ Alternatively, the layer of hydrated ferrous chloride may be dehydrated and oxidized to the ferric state according to the following reactions:

(3) $FeCl_2 \cdot 4H_2O \rightarrow FeCl_2 + 4H_2O$ (4) $3FeCl_2 + \tfrac{1}{2}O_2 \rightarrow 2FeCl_3 + FeO$ The anhydrous ferric chloride thus produced undergoes a double decomposition reaction with the steam produced from flash evaporation of the pickle liquor next introduced to the hearth surface in proximity to the ferric chloride. This reaction takes place according to:

(5) $2FeCl_3 + 3H_2O \rightarrow Fe_2O_3 + 6HCl$

The overall reaction for the conversion of anhydrous ferrous chloride into ferric oxide and hydrochloric acid can be resolved into the following equation:

(6) $2FeCl_2(s) + \tfrac{1}{2}O_2(g)$
$+ 2H_2O(g) \rightarrow Fe_2O_3(s) + 4HCl(g)$ The controlled sequential introduction of pickle liquor to an area of hearth surface, preferably at a timed rate of about three seconds between liquor additions, is critical in order to permit oxidation and dehydration of the ferrous chloride to ferric chloride in whichever sequency of reactions they should occur; with subsequent decomposition of the ferric chloride while obviating sublimation of the anhydrous ferric chloride at the elevated hearth temperature, thus permitting the several reactions to proceed to completion.

DESCRIPTION OF THE DRAWING

A more comprehensive understanding of the present invention will become apparent from the following detailed description with reference to the accompanying drawings, in which.

DESCRIPTION OF THE PREFERRED EMBODIMENTS

Figure 1:
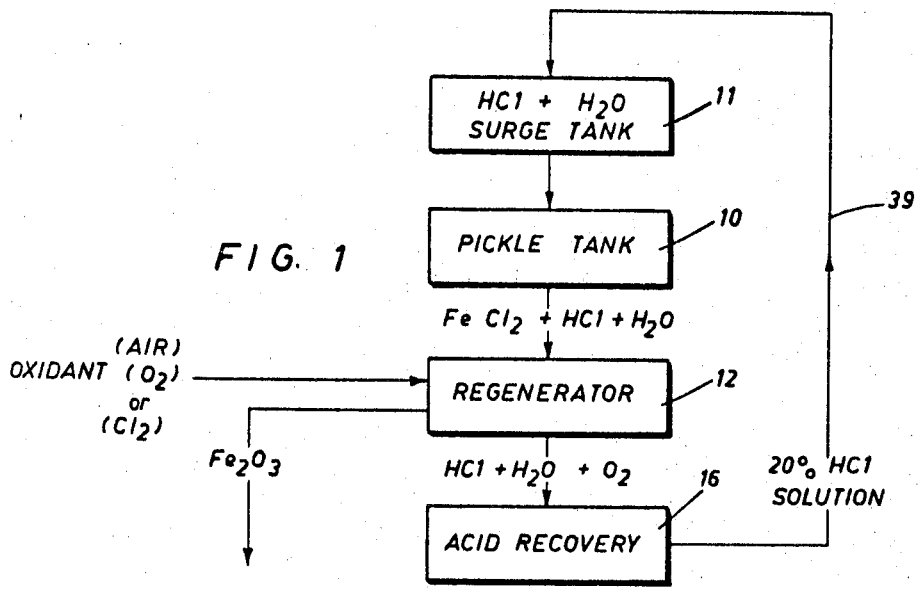
FIGURE 1 is a schematic illustration of a flowsheet of an embodiment of the process of the present invention.

Referring now to the flowsheet in FIGURE 1 of the drawing, pickling tank 10 contains the waste liquor to be treated which, in the present description, consists of a solution of ferrous chloride and hydrogen chloride in water. The waste liquor is pumped to the regenerator unit designated by numeral 12 wherein the liquor is pulsed in discrete portions onto the rotary hearth having a coating of ferric oxide maintained at an elevated temperature of up to about 1200° F., preferably about 950° F. The free acid and water content of the liquor immediately vaporize in the evaporating chamber and the free acid and water in gaseous form are discharged to the acid extractor 16. A thin layer of hydrated ferrous chloride remaining on the hearth surface in the regenerator 12 is oxidized and dehydrated in an oxidizing atmosphere maintained in the chamber and hydrolysed by steam produced in situ by the controlled sequential introduction of pickle liquor to an area of hearth surface to form iron oxide with the concurrent evolution of gaseous hydrochloric acid which is recovered in extractor 16 to join the free hydrochloric acid and water therein and re-cycled to surge tanks 11. An oxidizing atmosphere can be maintained by the continuous introduction of air, oxygen or chlorine gas. The iron oxide is scraped from the hearth surface and is discharged in substantially pure form from the system.

Figure 2:
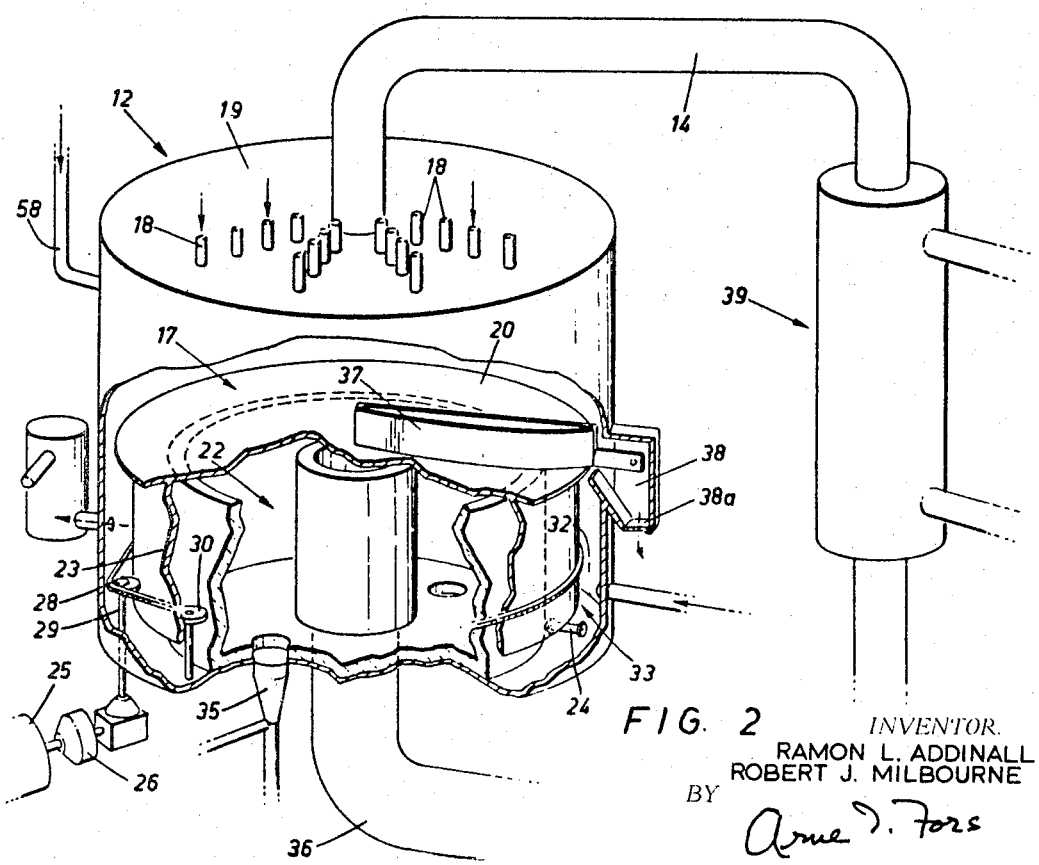
FIGURE 2 is a perspective view, partly cut away, of an embodiment of a regenerator for effecting the process of the present invention.
Figure 3:
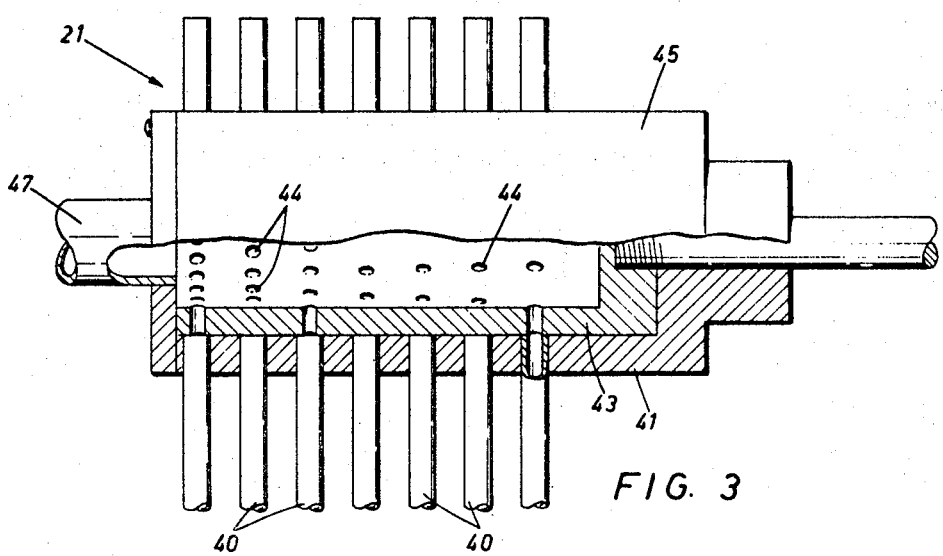
FIGURE 3 is a perspective view, partly cut away, of a proportional flow regulator for use in the process.

One embodiment of the apparatus of the regenerator unit employed to carry out the process of the present invention will now be described with particular reference to FIGURES 2 and 3. The liquor pumped from pickle tank 10 is fed into evaporating chamber 17 of regenerator 12 through a plurality of openings 18 formed in the top plate 19 of chamber 17. Openings 18 are arranged in radial groups, each radial group defining an angular relationship of about 30° relative to the adjacent radial group, for reasons which will become apparent as the description proceeds. The volume and timed interval of waste pickle liquor feed, i.e. rate of feed, to chamber 17 through openings 18 are controlled and regulated by proportional distributor 21, to be described hereinbelow, to provide a controlled sequential liquor feed per unit area of the hearth 20. In the embodiment illustrated, hearth 20 forms the roof of combustion chamber 22 and is in the shape of a circular disc concentric with cover plate 19 having a circular depending wall 23 secured to its underside which functions as the exterior side wall of combustion chamber 22. The lower edge of wall 23 is adapted to travel on support rollers 24 such that hearth 20 can be rotated about its axis below cover plate 19 by prime mover 25 with gear reducer 26 and drive sprocket 28 on output shaft 29. Alignment bearings 30 spaced about 120° circumferentially about wall 23 guide said wall and hearth 20 in their rotation.

The lower edge of wall 23 is submerged in a water seal formed by trough 32 having cooling seal water 33 therein such that evaporating chamber 17 is isolated from combustion chamber 22 thereby preventing the flow of combustion gases to the said evaporating chamber. Fuel burners 35 supply heat to hearth 20 to maintain the hearth at the desired reaction temperature, an exhaust duct 36 being used to discharge combustion products from chamber 22. A gaseous oxidant such as air or oxygen can be introduced to evaporating chamber 17 through line 58.

Iron oxide produced on the upper surface of hearth 20 is scraped by fixed radial scraper 37 into chute 38 and discharged intermittently from the system through door 38a. Gaseous reaction products are discharged through duct 14 to an extractor such as the water-cooled condenser 39 and the condensed product is re-cycled to surge tank 11. Although the embodiment illustrated shows the use of a condenser, it may be preferred to employ an adiabatic water absorber of types well known in the art.

It will be understood that hearth 20 can be stationary and can be rectangular or circular in shape, with a scraper adapted to reciprocate across or revolve about the hearth to scrape iron oxide into a discharge chute.

The desired hearth temperature of about 950° F. can be controlled within ±15 Fahrenheit degrees by employing a chromelalumel thermocouple brushing the hearth, the control signal being fed to a pyrometer operating a solenoid valve in the burner gas line, not shown, Although the process will operate at temperatures below 950° F., the decomposition temperature of ferric chloride being 800° F., the rate of reaction is undesirably slow at reduced temperatures. At temperatures above 1200° F. the rate of sublimation of ferric chloride is rapid, resulting in excessive quantities of ferric chloride being discharged with the gaseous hydrochloric acid and steam. A temperature of 950° F. provides a practical rate of reaction with minimum ferric chloride losses due to sublimation.

Hearth 20, as illustrated, is rotated relative to the openings 18 in cover plate 19 at a rate sufficient to permit each discrete portion of waste pickle liquor introduced sequentially at a controlled rate through said openings 18 onto a unit area of the hearth surface to be vaporized and the resulting hydrated ferrous chloride oxidized and dehydrated to ferric chloride prior to the addition of the next discrete portion of liquor. The rate and sequence of introduction of the solution of waste pickle liquor is controlled by proportional distributor 21 having a plurality of outlets 40 in the periphery of a stator 41, outlets 40 being in communication with openings 18 in cover plate 19. A rotor 43 mounted within stator 41 has a plurality of openings 44 formed about its periphery adapted to be momentarily aligned with stator outlets 40 to permit the flow of liquor therethrough from rotor chamber 45 which is maintained under pressure by liquor feed line 47. The number of rotor openings 44 is increased towards one end of the rotor to permit an increased flow frequency through stator outlets 40 corresponding to openings 18 located at the periphery of cover plate 19 because of the increased surface area at the hearth periphery. The rate of rotation of rotor 43 is determined by a speed controller interconnecting shaft 50 with a prime mover.

In the present embodiment applied to the regeneration of hydrochloric acid waste pickle liquor, a unit area of hearth surface passes below a radial set of openings 18 about every three seconds for receiving the next portion of liquor. We have found the dehydrated ferrous chloride is oxidized to its ferric state and dehydrated in about three seconds and thus is receptive to the addition of the sequential introduction of liquor in pulsed discrete portions at three second intervals for production of steam in situ and hydrolysis of the ferric chloride into ferric oxide and gaseous hydrochloric acid.

The above-described regenerator, having inlet openings 18 formed in a 90° sector only and oxygen introduced through line 58, was operated for 130 minutes to process 45.2 litres of liquor feed having 105 grams per litre FeCl₂ and 111 grams per litre hydrochloric acid at a rate of 0.348 litre per minute with an oxygen flowrate of 11.2 litres per minute, hearth temperature of 950° F. ±15 Fahrenheit degrees, hearth rotation of 1.5 r.p.m., and direct condensation acid recovery. The data following will serve to illustrate the operation of the process.

|      | Input (kg.) | Actual output (kg.) | Theoretical output (kg.) | Yield (percent) |
|------|-------------|---------------------|--------------------------|-----------------|
| HCl  | 5.02        | 7.84                | 8.07                     | 97              |
| FeCl₂| 6.16        | 0.282               |                          |                 |
| H₂O  | 38.54       | 38.50               | 38.50                    | 100             |

An operating temperature of 950° F. proved satisfactory with the hearth rotating at the rate of 1.5 r.p.m. and the liquor fed at flows of up to 0.5 litre/min., equivalent to about 0.385 litre/hr./in.² of the hearth surface area.

The present invention provides a number of important advantages. The continuous, closed circulating system permits optimum recovery of acid and metal oxide constituents with a minimum of reactor space requirements at a low capital cost due to the fact that the gaseous products of combustion and the products of the reaction are kept separate. The process is insensitive to and independent of concentration changes in the acid solution of metal salts and can be operated automatically with a minimum of skilled personnel.

What we claim as new and desired to protect by Letters Patent of the United States is:

1. In a process for the regeneration of an aqueous solution of metal chlorides and hydrogen chloride for the recovery of hydrochloric acid values and the production of metal oxides, the improvement which comprises feeding the aqueous chloride solution in pulsed discrete portions into a reaction chamber, externally heated such that reactants of the process are maintained separate from any products of combustion, at predetermined timed intervals onto a heated surface in an oxidizing atmosphere for vaporizing free water and hydrochloric acid for the evolution of steam and gaseous hydrochloric acid with the attendant deposition of hydrated metal chlorides on said heated surface and for oxidizing and dehydrating said metal chlorides and hydrolysing said oxidized metal chlorides by reaction with steam produced in situ by vaporization of the aqueous solution fed to the heated surface in proximity to the oxidized metal chlorides, said predetermined timed intervals being sufficient to permit vaporization of the liquid constituents of each addition of aqueous solution with deposition, oxidization and dehydration of metal chlorides contained therein before the next addition of the solution in proximity to the said chlorides, discharging said steam and gaseous hydrochloric acid from the reaction vessel to extract hydrochloric acid vapour therefrom, and separately withdrawing the metal oxides.

2. A process as claimed in claim 1, in which the aqueous solution is a solution of ferrous chloride and hydrochloric acid in water and the atmosphere contains an available oxidant whereby the free hydrochloric acid and water are vaporized with the deposition of solid hydrous ferrous chloride which becomes oxidized to ferric chloride before dehydration and decomposition to ferric oxide and hydrochloric acid by reaction of the ferric chloride with the steam produced by the water contained in the solution next fed to the heated surface.

3. A process as claimed in claim 1, in which the aqueous solution is a solution of ferrous chloride and hydrochloric acid in water and the atmosphere contains an available oxidant, whereby the free hydrochloric acid and water are vaporized with the deposition of solid hydrous ferrous chloride which becomes dehydrated and oxidized to ferric chloride and hydrolysed to ferric oxide and hydrochloric acid by reaction of the ferric chloride with the steam produced by the water contained in the solution next fed to the heated surface.

4. A process as claimed in claim 2 which comprises feeding the said solution at a controlled rate onto a heated surface such that an area of heated surface receives an addition of liquor about every three seconds.

5. A process as claimed in claim 3 which comprises feeding the said solution at a controlled rate onto a heated surface such that an area of heated surface receives an addition of liquor about every three seconds.

6. A process as claimed in claim 2 in which said heated surface has a temperature of from 800° F. to 1200° F.

7. A process as claimed in claim 3 in which said heated surface has a temperature of from 800° F. to 1200° F.

8. A process as claimed in claim 2 in which said heated surface has a temperature of about 950° F.

9. A process as claimed in claim 3 in which said heated surface has a temperature of about 950° F.

10. A process as claimed in claim 2 in which said solution is fed in pulsed discrete portions at about 0.385 litre/hr./in.²

11. A process as claimed in claim 3 in which said solution is fed in pulsed discrete portions at about 0.385 litre/hr./in.²

12. A process as claimed in claim 2 in which said oxidant is selected from the group consisting of air, oxygen and chlorine.

13. A process as claimed in claim 3 in which said oxidant is selected from the group consisting of air, oxygen and chlorine.

References Cited

UNITED STATES PATENTS

| 1,917,226 | 7/1933  | Bacon et al. | 23—87 XR  |
| 1,917,235 | 7/1933  | Bacon et al. | 23—154 XR |
| 1,938,461 | 12/1933 | Prutton      | 23—87     |
| 2,493,629 | 1/1950  | Henderson    | 23—87     |
| 2,723,902 | 11/1955 | Reeve et al. | 23—87     |
| 3,310,435 | 3/1967  | Robinson et al. | 23—154 XR |

FOREIGN PATENTS 877,066  9/1961  Great Britain.

EDWARD STERN, *Primary Examiner.*

U.S. Cl. X.R.

23—87, 200